United States Patent
Jangid et al.

(10) Patent No.: US 12,272,032 B2
(45) Date of Patent: Apr. 8, 2025

(54) MACHINE LEARNING-BASED APPROACHES FOR SYNTHETIC TRAINING DATA GENERATION AND IMAGE SHARPENING

(71) Applicant: Samsung Electronics Co., Ltd., Suwon-si (KR)

(72) Inventors: Devendra K. Jangid, Santa Barbara, CA (US); John Seokjun Lee, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 17/820,795

(22) Filed: Aug. 18, 2022

(65) Prior Publication Data
US 2024/0062342 A1   Feb. 22, 2024

(51) Int. Cl.
*G06T 5/70* (2024.01)

(52) U.S. Cl.
CPC ...... *G06T 5/70* (2024.01); *G06T 2207/20081* (2013.01); *G06T 2207/20084* (2013.01)

(58) Field of Classification Search
CPC .......... G06T 5/70; G06T 2207/20081; G06T 2207/20084; G06T 3/4015; G06T 5/60; G06T 5/73

See application file for complete search history.

(56) References Cited

U.S. PATENT DOCUMENTS

| | | | |
|---|---|---|---|
| 11,756,166 B2* | 9/2023 | Saharia | G06T 5/70 382/100 |
| 2018/0336662 A1* | 11/2018 | Kimura | G06T 5/70 |
| 2021/0241421 A1 | 8/2021 | Pan et al. | |
| 2021/0241429 A1 | 8/2021 | Pan et al. | |
| 2022/0122235 A1 | 4/2022 | Liang et al. | |
| 2023/0410259 A1* | 12/2023 | Melnyk | G06T 5/60 |

FOREIGN PATENT DOCUMENTS

CN   113902647 A   1/2022

OTHER PUBLICATIONS

Zhang, Deep motion blur removal using noisy/blurry image pairs, Journal of Electronic Imaging, May/Jun. 2021, vol. 30(3) (Year: 2021).*

(Continued)

*Primary Examiner* — Amir Alavi
*Assistant Examiner* — Lei Zhao

(57) ABSTRACT

A method includes obtaining an input image that contains blur. The method also includes providing the input image to a trained machine learning model, where the trained machine learning model includes (i) a shallow feature extractor configured to extract one or more feature maps from the input image and (ii) a deep feature extractor configured to extract deep features from the one or more feature maps. The method further includes using the trained machine learning model to generate a sharpened output image. The trained machine learning model is trained using ground truth training images and input training images, where the input training images include versions of the ground truth training images with blur created using demosaic and noise filtering operations.

26 Claims, 8 Drawing Sheets

(56) References Cited

OTHER PUBLICATIONS

Zamir, Learning Enriched Features for Fast Image Restoration and Enhancement, IEEE Transactions on Pattern Analysis and Machine Intelligence, vol. 45, No. 2, Feb. 2023 (Date of publication Apr. 13, 2022) (Year: 2022).*
Brown, "Understanding the In-Camera Image Processing Pipeline for Computer Vision," 2016 IEEE Conference on Computer Vision and Pattern Recognition, Jun. 2016, 354 pages.
Zhang et al., "Image Super-Resolution Using Very Deep Residual Channel Attention Networks," European Conference on Computer Vision, Oct. 2018, 16 pages.
Zamir et al., "Multi-Stage Progressive Image Restoration," IEEE/CVF Conference on Computer Vision and Pattern Recognition, Jun. 2021, 11 pages.
Ramanarayanan et al., "MRI Super-Resolution using Laplacian Pyramid Convolutional Neural Networks with Isotropic Undecimated Wavelet Loss," 42nd Annual International Conference of the IEEE Engineering in Medicine & Biology Society, Jul. 2020, 4 pages.
Zha et al., "A Lightweight Dense Connected Approach with Attention on Single Image Super-Resolution," Electronics, vol. 10, Issue 11, Apr. 2021, 14 pages.

* cited by examiner

MACHINE LEARNING-BASED APPROACHES FOR SYNTHETIC TRAINING DATA GENERATION AND IMAGE SHARPENING

TECHNICAL FIELD

This disclosure relates generally to machine learning systems. More specifically, this disclosure relates to machine learning-based approaches for synthetic training data generation and image sharpening.

BACKGROUND

Machine learning-based technologies are being used more and more often in many imaging applications, such as to perform denoising, motion deblurring, high dynamic range (HDR) imaging, segmentation, disparity estimation, or other imaging functions. However, creating training data for use in training machine learning models can be challenging for some applications. Among other reasons, this is because training data needs to be properly designed so that machine learning models are trained to perform intended algorithms. One example of this difficulty involves super-resolution, which is an application where image data is processed in order to add missing details into images. If high-resolution images are downsampled to produce pairs of high-resolution and downsampled images for use as training data, a super-resolution machine learning model may inadvertently be trained to perform upsampling rather than super-resolution.

Many mobile electronic devices, such as smartphones and tablet computers, include cameras that can be used to capture still and video images. While convenient, cameras on mobile electronic devices typically suffer from a number of shortcomings. For example, image processing pipelines in mobile devices have advanced over the last several years and are closing the gap with digital single-lens reflex (DSLR) cameras. One reason for this is that machine learning models or other technologies have been developed to provide features such as HDR imaging, low-light imaging, and noise reduction. However, one challenge here involves determining how to handle the trade-off between noise reduction and image sharpening. If noise filtering is applied too aggressively, it often results in images containing blurry edges.

SUMMARY

This disclosure relates to machine learning-based approaches for synthetic training data generation and image sharpening.

In a first embodiment, a method includes obtaining an input image that contains blur. The method also includes providing the input image to a trained machine learning model, where the trained machine learning model includes (i) a shallow feature extractor configured to extract one or more feature maps from the input image and (ii) a deep feature extractor configured to extract deep features from the one or more feature maps. The method further includes using the trained machine learning model to generate a sharpened output image. The trained machine learning model is trained using ground truth training images and input training images, where the input training images include versions of the ground truth training images with blur created using demosaic and noise filtering operations.

In a second embodiment, an apparatus includes at least one processing device configured to obtain an input image that contains blur, process the input image using a trained machine learning model, and use the trained machine learning model to generate a sharpened output image. The trained machine learning model includes (i) a shallow feature extractor configured to extract one or more feature maps from the input image and (ii) a deep feature extractor configured to extract deep features from the one or more feature maps. The trained machine learning model is trained using ground truth training images and input training images, where the input training images include versions of the ground truth training images with blur created using demosaic and noise filtering operations.

In a third embodiment, a non-transitory computer readable medium contains instructions that when executed cause at least one processor to obtain an input image that contains blur, process the input image using a trained machine learning model, and use the trained machine learning model to generate a sharpened output image. The trained machine learning model includes (i) a shallow feature extractor configured to extract one or more feature maps from the input image and (ii) a deep feature extractor configured to extract deep features from the one or more feature maps. The trained machine learning model is trained using ground truth training images and input training images, where the input training images include versions of the ground truth training images with blur created using demosaic and noise filtering operations.

In a fourth embodiment, a method includes obtaining multiple ground truth training images. The method also includes generating multiple input training images using the ground truth training images, where generating the input training images includes performing demosaic and noise filtering operations to add blur to the ground truth training images. The method further includes training a machine learning model to remove blur from images and generate sharpened images using the ground truth training images and the input training images.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
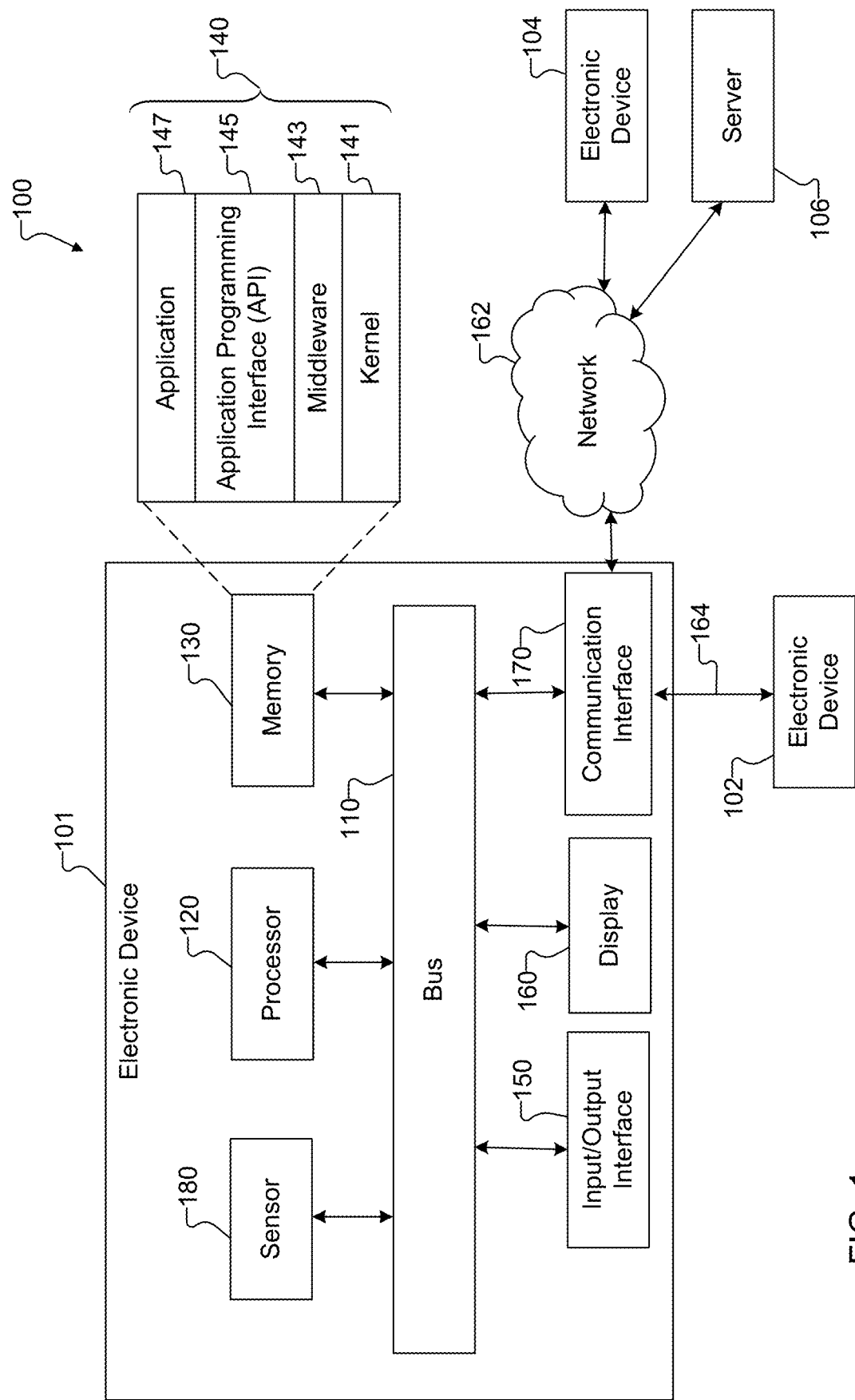
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, machine learning-based technologies are being used more and more often in many imaging applications, such as to perform denoising, motion deblurring, high dynamic range (HDR) imaging, segmentation, disparity estimation, or other imaging functions. However, creating training data for use in training machine learning models can be challenging for some applications. Among other reasons, this is because training data needs to be properly designed so that machine learning models are trained to perform intended algorithms. One example of this difficulty involves super-resolution, which is an application where image data is processed in order to add missing details into images. If high-resolution images are downsampled to produce pairs of high-resolution and downsampled images for use as training data, a super-resolution machine learning model may inadvertently be trained to perform upsampling rather than super-resolution.

This disclosure provides a synthetic training data generation pipeline, which can generate synthetic training data that is used for training a machine learning model. As described in more detail below, the synthetic training data generation pipeline can receive ground truth training images and create controllable blur within the ground truth training images, thereby generating input training images. For instance, the synthetic training data generation pipeline may introduce noise into the ground truth training images, perform demosaic interpolation, and apply a noise filter in order to generate the input training images. The ground truth training images and the input training images may then be used as training data to train a machine learning model. In this way, the training data that is used can be controlled so that the machine learning model is accurately trained to perform at least one desired function. As a particular example, a machine learning model may be trained to perform image sharpening, where the machine learning model can be trained to invert or otherwise substantially remove processing blur that is caused by demosaicing and noise filtering operations.

Also, as noted above, many mobile electronic devices, such as smartphones and tablet computers, include cameras that can be used to capture still and video images. While convenient, cameras on mobile electronic devices typically suffer from a number of shortcomings. For example, image processing pipelines in mobile devices have advanced over the last several years and are closing the gap with digital single-lens reflex (DSLR) cameras. One reason for this is that machine learning models or other technologies have been developed to provide features such as HDR imaging, low-light imaging, and noise reduction. However, one challenge here involves determining how to handle the trade-off between noise reduction and image sharpening. If noise filtering is applied too aggressively, it often results in images containing blurry edges.

This disclosure provides a low-complexity machine learning model that is trained to perform image sharpening. As described in more detail below, the machine learning model can be trained to improve the sharpness of images, where the sharpness of the images is previously degraded due to demosaicing, noise filtering, or other image processing operations. In some cases, the machine learning model can optionally be trained using the training data generated as described above and as described in more detail below. This allows the machine learning model to be trained to invert or otherwise substantially remove processing blur caused by demosaicing and noise filtering operations more effectively, which can lead to a reduced number of blurry edges in the resulting images.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to generate synthetic training data for training at least one machine learning model. Also or alternatively, as described below, the processor 120 may be used to perform image sharpening using at least one trained machine learning model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for generating synthetic training data and/or for performing image sharpening. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to generate synthetic training data for training at least one machine learning model. Also or alternatively, as described below, the server 106 may be used to perform image sharpening using at least one trained machine learning model.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
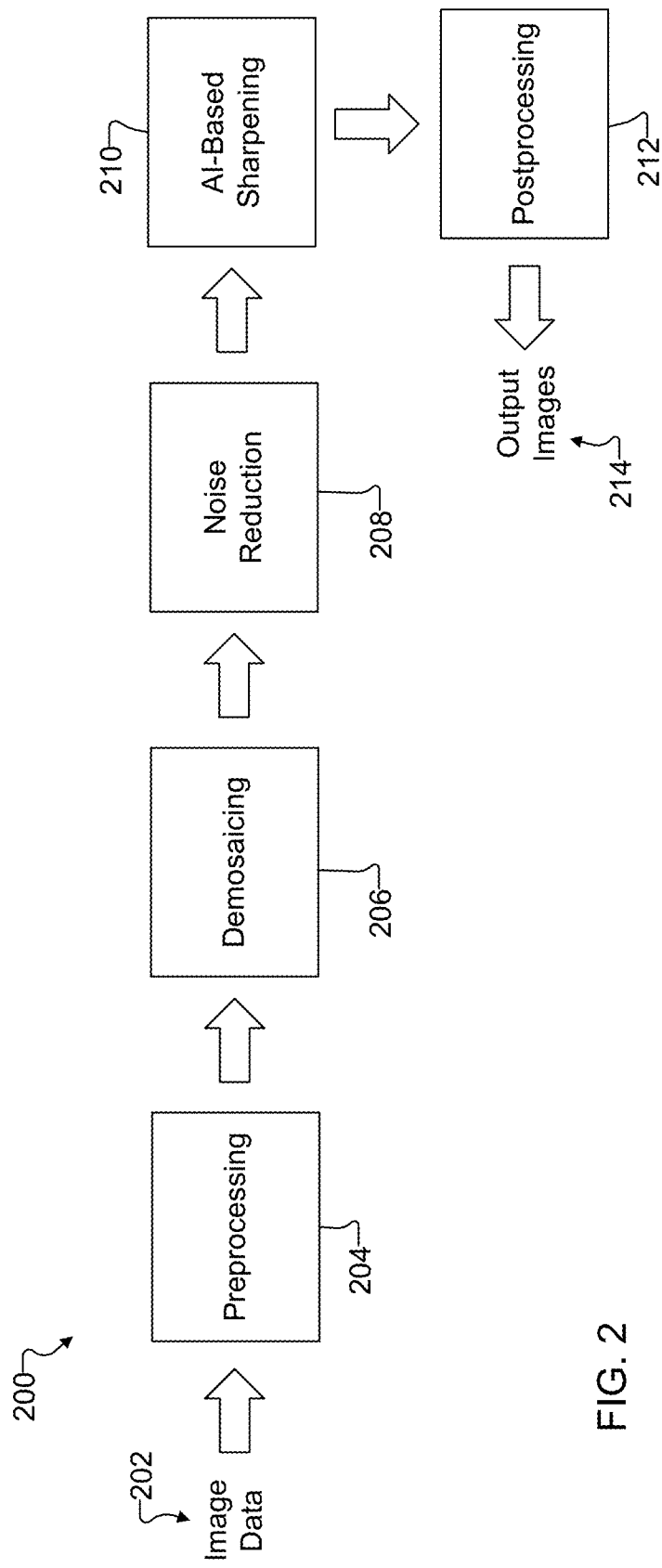
FIG. 2 illustrates an example image processing pipeline in an electronic device in accordance with this disclosure.

FIG. 2 illustrates an example image processing pipeline 200 in an electronic device in accordance with this disclosure. For ease of explanation, the image processing pipeline 200 shown in FIG. 2 is described as being implemented on or supported by the electronic device 101 in the network configuration 100 of FIG. 1. However, the image processing pipeline 200 shown in FIG. 2 could be used with any other suitable device and in any other suitable system, such as when the image processing pipeline 200 is implemented on or supported by the server 106.

As shown in FIG. 2, the image processing pipeline 200 receives and processes input image data 202, which represents any suitable image data captured of at least one scene. In some cases, the input image data 202 represents raw image data, such as raw image data generated by one or more cameras or other imaging sensors 180 of an electronic device 101. The input image data 202 may represent image data associated with one or more images being captured, such as one or more photographic or still images or one or more images forming at least part of a video sequence.

In many mobile electronic devices and other electronic devices, the input image data 202 represents data generated by one or more imaging sensors 180 that include or are associated with one or more Bayer filter arrays or other color filter arrays. Color filter arrays typically include multiple color filters, where each color filter limits the illumination provided to a pixel of an imaging sensor 180 to a single color. For example, a Bayer filter array typically includes a repeating pattern of filters that pass red light to one pixel, blue light to another pixel, and green light to two other pixels of an imaging sensor 180. As a result, the imaging sensor 180 typically generates input image data 202 containing red pixel values for a first subset of pixels, blue pixel values for a second subset of pixels, and green pixel values for a third subset of pixels (where the third subset of pixels could include around twice as many pixels as the first or second subset of pixels).

The input image data 202 can be subjected to one or more preprocessing operations 204, which can generally process the input image data 202 into suitable form for subsequent image processing. For example, the preprocessing operations 204 may include performing analog-to-digital conversion if the image data 202 is obtained in analog format. The preprocessing operations 204 may also include performing gain control to increase or decrease the brightness of portions or all of captured images. One or more of the preprocessing operations 204 may involve the use of at least one lookup table (LUT), such as when pixel values in the input image data 202 are replaced with corresponding pixel values retrieved from a lookup table. In general, any suitable processing operation or operations may occur as needed or desired before additional image processing operations are performed.

The preprocessed image data is processed using a demosaicing operation 206 and a noise reduction operation 208 (which may be referred to as a denoising or noise filtering operation). Demosaicing refers to a process where a full-color image frame can be reconstructed based on image data captured by an imaging sensor 180 that uses a color filter array, such as a Bayer filter array, as described above. Each color filter in the color filter array typically passes light of a specific color spectrum (such as red, green, blue, or white) to an associated pixel, and different pixels generate image data for different color spectra. The data associated with each color spectrum may be referred to as a "channel" for an image frame. When a color filter array is used, only one color spectrum is typically sampled at each pixel for an image frame. The demosaicing operation 206 can be performed to convert image data produced using a Bayer filter array or other color filter array into reconstructed red-green-blue (RGB) data. For example, the demosaicing operation 206 can involve various interpolations that are used to fill in missing information, such as by estimating other colors' image data for each pixel. In some cases, such as when using a Bayer filter array or some other types of color filter arrays, approximately twice as many pixels may capture image data using green filters compared to pixels that capture image data using red or blue filters. This can introduce non-uniformities into the captured image data, such as when the red and blue image data each have a lower signal-to-noise ratio (SNR) and a lower sampling rate compared to the green image data. Among other things, the green image data can capture high-frequency image content more effectively than the red and blue image data. In some cases, the demosaicing operation 206 may take information captured by at least one highly-sampled channel (such as the green channel and/or the white channel) and use that information to correct limitations of lower-sampled channels (such as the red and blue channels), which can help to reintroduce high-frequency image content into the red and blue image data. Note, however, that any other or additional demosaicing technique(s) may be used here.

The noise reduction operation 208 processes the reconstructed RGB image data or other image data that is output from the demosaicing operation 206 in order to reduce noise contained in the image data. For example, the noise reduction operation 208 may include filter kernels or other filters that are configured to remove noise from image data. This may allow, for instance, the noise reduction operation 208 to remove sampling, interpolation, and aliasing artifacts and noise from the image data. In some cases, the noise reduction operation 208 may be configured to remove sampling, interpolation, and aliasing artifacts and noise in subsampled image color channels (such as the red and blue channels) using information from at least one higher-sampled color channel (such as the green channel and/or the white channel). This can improve the quality of the subsampled color channels based on the color channel(s) having a higher sampling rate, which helps to equalize the signal quality across the color channels. Note, however, that any other or additional noise reduction technique(s) may be used here.

The demosaicing operation 206 and the noise reduction operation 208 may individually or collectively create blur within images being generated by the image processing pipeline 200. Because this blur is created by the processing operations performed by the image processing pipeline 200, the blur may be referred to as "in-processing blur." In some cases, the blurring caused by demosaicing and noise filtering operations may represent the main source of sharpness losses in the image processing pipeline 200. Here, an artificial intelligence (AI)-based sharpening operation 210 can be performed in order to substantially or completely eliminate the blur created by the demosaicing operation 206, the noise reduction operation 208, or other source of in-processing blur or other artificial blur. The sharpening operation 210 can be performed using one or more machine learning models that have been trained to reduce or remove blur created by sources such as the demosaicing operation 206 or the noise reduction operation 208. Example implementation details of the sharpening operation 210 are provided below, and example details regarding the training of one or more machine learning models for use in or with the sharpening operation 210 are provided below.

Image data representing sharpened image frames can be subjected to one or more postprocessing operations 212, which can generally process the image data further in order to generate finalized output images 214. For example, the postprocessing operations 212 may include performing a color space transformation in order to adjust the color space of the image data and apply one or more color preferences to the image data. The postprocessing operations 212 may also include performing tone reproduction in order to achieve a desired tone in the output images 214. The postprocessing operations 212 may further include applying compression (such as JPEG compression) to the image data, generating files for individual images or video sequences (such as exchangeable image file or "Exif" files), and storing the files in memory. In general, any suitable processing operation or operations may occur as needed or desired after image processing operations have been performed.

It should be noted that the functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an image processing pipeline 200 in an electronic device, various changes may be made to FIG. 2. For example, the order of the operations performed in the image processing pipeline 200 may vary from what is shown in FIG. 2. Also, one or more additional operations may be included or one or more of the operations shown in FIG. 2 may be omitted if needed or desired. Further, various components in FIG. 2 may be combined, further subdivided, replicated, or rearranged according to particular needs. In addition, the image processing pipeline 200 of FIG. 2 represents one example environment where an AI-based sharpening operation 210. However, an AI-based sharpening operation 210 may be used in any other suitable environment.

Figure 3:
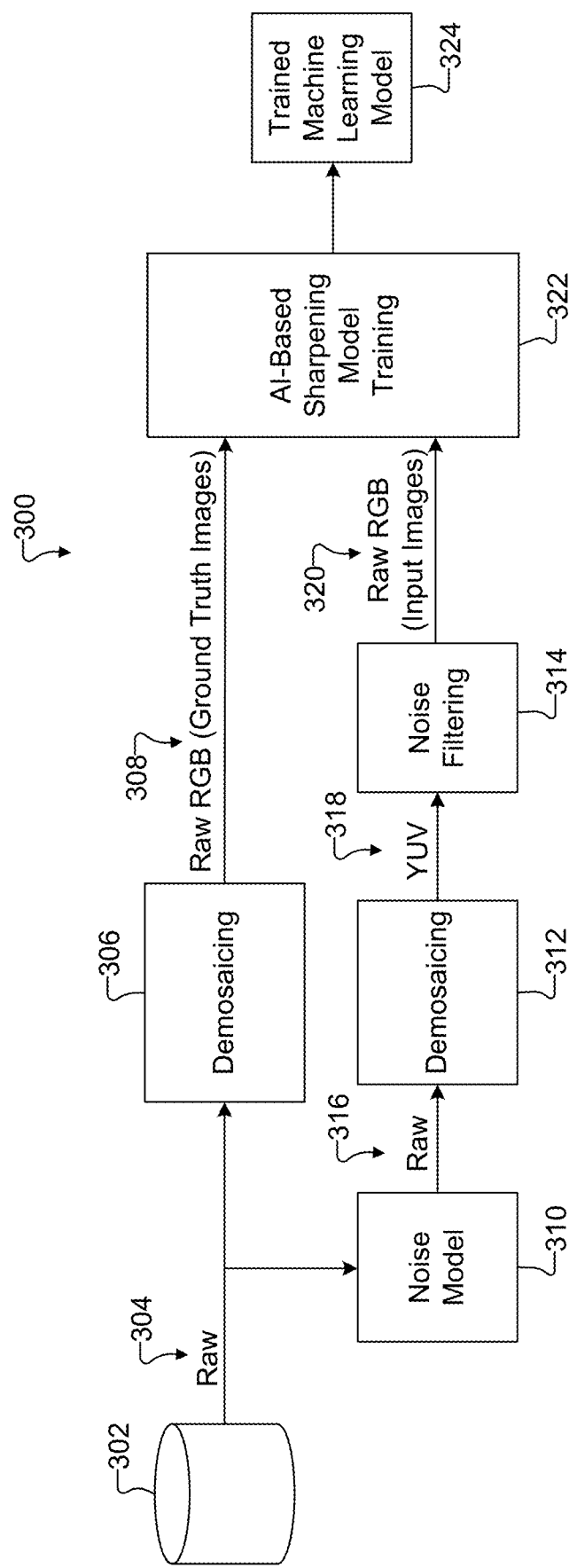
FIG. 3 illustrates an example pipeline for synthetic training data generation as part of a training process for a machine learning model in accordance with this disclosure.

FIG. 3 illustrates an example pipeline 300 for synthetic training data generation as part of a training process for a machine learning model in accordance with this disclosure. The pipeline 300 may, for example, represent a synthetic training data generation pipeline that is used to generate synthetic training data for a machine learning model, such as a machine learning model used to implement the AI-based sharpening operation 210. For ease of explanation, the pipeline 300 shown in FIG. 3 is described as being implemented on or supported by the server 106 in the network configuration 100 of FIG. 1. However, the pipeline 300 shown in FIG. 3 could be implemented or supported using any other suitable device and in any other suitable system, such as when the pipeline 300 is implemented on or supported by the electronic device 101.

As shown in FIG. 3, at least one source 302 provides high-quality input image data 304 for use in the pipeline 300. The high-quality image data 304 here can represent or be associated with images having very little or no blur. For example, the high-quality image data 304 may be captured using at least one mobile or other electronic device mounted on a tripod. In some cases, the high-quality image data 304 can be generated using relatively long exposure times. Also, in some cases, the high-quality image data 304 can be generated using relatively low ISO values, such as an ISO of 50. Further, in some cases, the high-quality image data 304 may represent raw image data, although the high-quality image data 304 may have any other suitable form. Ideally, the high-quality image data 304 represents multiple sharp and low-noise images. The high-quality image data 304 may be obtained from any suitable source(s) 302, such as one or more public or private repositories of images or image data.

The high-quality image data 304 is processed using a first demosaic operation 306, which converts the high-quality image data 304 into ground truth training images 308. For example, the demosaic operation 306 can perform interpolations or other functions to fill-in missing pixel values in various color channels based on other pixel values within those color channels. The demosaic operation 306 can also identify high-frequency image content in at least one highly-sampled color channel (such as the green channel and/or the white channel) and use that information to correct limitations of lower-sampled channels (such as the red and blue channels). Note, however, that any other or additional demosaicing technique(s) may be used here. In some embodiments, the demosaic operation 306 can be configured to use minimum filtering or otherwise configured for low-noise operation, which can help to reduce or minimize the amount of noise within the ground truth training images 308. A minimum filtering operation is defined as the selection of the minimum of all pixel values within a defined local region of an image, where the local region is defined using a sliding or moving window. By performing this type of demosaic interpolation, the sharpness of the images represented by the high-quality image data 304 can be substantially or completely maintained in the ground truth training images 308. The ground truth training images 308 can have or be associated with the same ISO value as the high-quality image data 304.

The high-quality image data 304 is also processed using a noise model 310, a second demosaic operation 312, and a noise filtering operation 314. The noise model 310 represents a synthetic noise model that generally operates to introduce synthetic or artificially-created noise into the high-quality image data 304. For example, the noise model 310 may introduce read noise, shot noise, or any other or additional type(s) of noise into the high-quality image data 304. Read noise represents noise associated with operation of pixels in an imaging sensor 180 and operation of analog-to-digital converters or other circuit components associated with the pixels. Shot noise represents noise associated with the discrete nature of photons being counted using the pixels in an imaging sensor 180. Both read noise and shot noise may be represented by the noise model 310, which allows synthetic noise to be artificially added to the high-quality image data 304. As a particular example, the noise model 310 may be used to simulate the noise that might be present if the high-quality image data 304 had been captured at a much higher ISO value, such as when the noise model 310 simulates the noise in the high-quality image data 304 if an ISO value of 1600 had been used (although this value is for illustration only). The output of the noise model 310 can represent noisy images 316, which in some cases may be represented using raw image data.

The noisy images 316 are processed by the second demosaic operation 312 in order to convert the noisy images 316 into demosaiced images 318. For example, the demosaic operation 312 can perform interpolations or other functions to fill-in missing pixel values in various color channels based on other pixel values within those color channels. The demosaic operation 312 can also identify high-frequency image content in at least one highly-sampled color channel (such as the green channel and/or the white channel) and use that information to correct limitations of lower-sampled channels (such as the red and blue channels). The demosaic operation 312 can further convert the image data of the noisy images 316 from the raw image data space into a different image data space (such as the YUV image data space) used by the demosaiced images 318. Note, however, that any other or additional demosaicing technique(s) may be used here. In some embodiments, the demosaic operation 312 can be configured to use the same type of demosaicing algorithm used by a mobile electronic device or other electronic device (such as the electronic device 101), which generally produces more noise than the demosaic operation 306.

The noise filtering operation 314 operates to reduce noise contained in the demosaiced images 318 in order to generate input training images 320. For example, the noise filtering operation 314 may include one or more filter kernels or other filters configured to remove noise from image data. As particular examples, the noise filtering operation 314 may be used to remove sampling, interpolation, and aliasing artifacts and noise from the image data forming the demosaiced images 318. The noise filtering operation 314 can also convert the image data of the demosaiced images 318 from the YUV image data space into a different image data space (such as the raw RGB image data space). Note, however, that any other or additional noise reduction technique(s) may be used here. Based on the operations performed here, the input training images 320 have or are associated with larger (and possibly much larger) ISO values compared to their corresponding ground truth training images 308.

The ground truth training images 308 and the input training images 320 are provided to and used by an AI-based sharpening model training operation 322. During the training operation 322, a machine learning model is trained to remove blur from images using the ground truth training images 308 and the input training images 320. The result is a trained machine learning model 324, which can be placed into operation and used to sharpen images captured by one or more electronic devices (such as the electronic device 101). As a particular example, the trained machine learning model 324 may be used during the AI-based sharpening operation 210 in order to sharpen images being generated using the image processing pipeline 200.

During the training operation 322, the input training images 320 are provided to a machine learning model being trained, and the machine learning model processes the input training images 320 in order to generate output images. The output images are compared to the ground truth training images 308, and differences between the output images and the ground truth training images 308 are identified and used to compute loss values. The loss values are representative of the errors in the operation of the machine learning model being trained. Various weights or other parameters of the machine learning model can be modified based on the computed loss values, and the input training images 320 can again be processed by the machine learning model so that additional output images are generated and compared to the ground truth training images 308. Ideally, the machine learning model improves over time and produces output images that are more and more similar to the ground truth training images 308. This iterative process can continue until the machine learning model generates output images having a suitably low loss or until some other criterion or criteria are met (such as a specified number of training iterations completing or a specified amount of training time elapsing).

The noise model 310, demosaic operation 312, and noise filtering operation 314 here are used to simulate the generation of images by a mobile or other electronic device, such as the electronic device 101. As noted above in FIG. 2, for instance, the electronic device 101 may include or support an image processing pipeline 200 that uses the demosaicing operation 206 and the noise reduction operation 208, and the blurring caused by the demosaicing and noise reduction operations 206 and 208 may represent the main source of sharpness losses in the image processing pipeline 200. The demosaic operation 312 in FIG. 3 can be used to simulate the sharpness losses caused by the demosaicing operation 206 in the image processing pipeline 200 of FIG. 2, and the noise filtering operation 314 in FIG. 3 can be used to simulate the sharpness losses caused by the noise reduction operation 208 in the image processing pipeline 200 of FIG. 2. This allows the pipeline 300 to computationally model the in-processing blur that is created within the image processing pipeline 200 of FIG. 2. Moreover, this allows the machine learning model 324 to be trained to reduce or minimize the blur caused by the demosaicing and noise reduction operations 206-208 in the image processing pipeline 200. Effectively, the machine learning model 324 can be trained to learn the inverse operation of the blurring caused by the demosaic and noise reduction operations 206-208, allowing the machine learning model 324 to be applied by the AI-based sharpening operation 210 in order to sharpen images.

The machine learning model 324 may represent any suitable machine learning structure that can be trained to reduce or substantially eliminate blurring in images. One example implementation of the machine learning model 324 is provided below. However, the machine learning model 324 may be implemented in any other suitable manner.

The machine learning model 324 can also be trained in any suitable manner. For example, the machine learning model 324 may be trained using an Adam optimizer, which is a well-known algorithm for training machine learning models. However, the machine learning model 324 may be trained in any other suitable manner. In addition, any suitable loss function may be used while training the machine learning model 324. In some embodiments, the loss function can be used to determine an L1 Charbonnier with edge loss between output images generated by the machine learning model 324 and the associated ground truth training images 308. An L1 loss function can be used to minimize a loss that is expressed as the sum of all absolute differences between two images. An L1 Charbonnier loss function incorporates an additional term (a Charbonnier penalty function) into the calculation of loss values. An edge loss can be used to penalize a machine learning model when the output images from the machine learning model lack one or more object edges that are contained in the associated ground truth images. Thus, a loss function based on an L1 Charbonnier with edge loss can represent a combination of these individual losses. However, any other suitable loss function may be used during training.

Once the machine learning model 324 has been adequately trained, the trained machine learning model 324 may be stored, output, or used in any suitable manner. For example, in some cases, the trained machine learning model 324 is generated by an electronic device implementing the image processing pipeline 200, and the trained machine learning model 324 can be placed into operation on that electronic device (such as in the AI-based sharpening operation 210). In other cases, the trained machine learning model 324 is generated by one electronic device and deployed to at least one other electronic device implementing the image processing pipeline 200. As a particular example, the server 106 may be used to generate and train the machine learning model 324, and the trained machine learning model 324 may be deployed to one or more electronic devices (such as the electronic device 101) for use by the AI-based sharpening operations 210 in the image processing pipelines 200 of those electronic devices.

It should be noted that the functions shown in or described with respect to FIG. 3 can be implemented in an electronic device 101, server 106, or other device in any suitable manner. For example, in some embodiments, at least some of the functions shown in or described with respect to FIG. 3 can be implemented or supported using one or more software applications or other software instructions that are executed by the processor 120 of the electronic device 101, server 106, or other device. In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions.

Although FIG. 3 illustrates one example of a pipeline 300 for synthetic training data generation as part of a training process for a machine learning model, various changes may be made to FIG. 3. For example, the order of the operations performed within the pipeline 300 may vary from what is shown in FIG. 3. Also, one or more additional operations may be included or one or more of the operations shown in FIG. 3 may be omitted if needed or desired. Further, various components in FIG. 3 may be combined, further subdivided, replicated, or rearranged according to particular needs.

Figure 4:
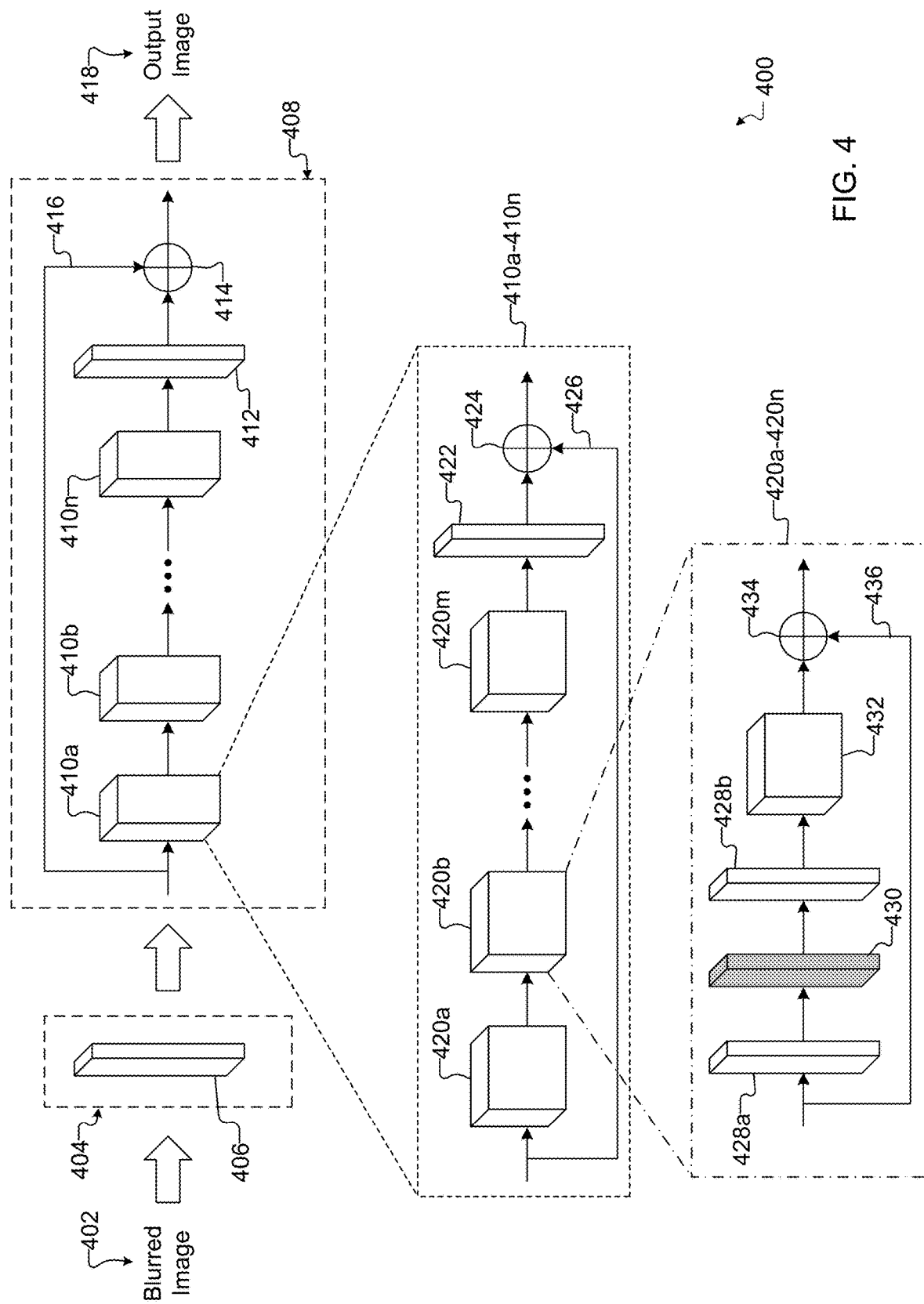
FIG. 4 illustrates an example machine learning model architecture for image sharpening in accordance with this disclosure.

FIG. 4 illustrates an example machine learning model architecture 400 for image sharpening in accordance with this disclosure. The architecture 400 may, for example, be implemented within the image processing pipeline 200, such as when the architecture 400 is used by a machine learning model implementing the AI-based sharpening operation 210. For ease of explanation, the architecture 400 shown in FIG. 4 is described as being implemented on or supported by the electronic device 101 in the network configuration 100 of FIG. 1. However, the architecture 400 shown in FIG. 4 could be implemented or supported using any other suitable device and in any other suitable system, such as when the architecture 400 is implemented on or supported by the server 106. Also, the trained machine learning model that is used here may optionally be generated using the pipeline 300 shown in FIG. 3, although the trained machine learning model may be trained in any other suitable manner.

As shown in FIG. 4, the architecture 400 is generally used to receive and sharpen one or more blurred input images 402. Each blurred input image 402 represents any suitable image containing in-processing or other artificially-created blurring. Each blurred input image 402 may, for example, be produced by the demosaicing and noise reduction operations 206 and 208 in the image processing pipeline 200.

Each blurred input image 402 is provided to a shallow feature extractor 404, which generally operates to extract one or more feature maps from the blurred input image 402. For example, the shallow feature extractor 404 may include a convolution layer 406 that has been trained to generate at least one feature map for each blurred input image 402, where the feature map identifies the extracted features from the blurred input image 402. Weights or other parameters of the convolution layer 406 can be adjusted during the training of the architecture 400, such as in the manner described above, so that the convolution layer 406 learns which features of the blurred input images 402 are useful in removing blur.

The feature maps generated by the shallow feature extractor 404 are provided to a deep feature extractor 408, which generally operates to extract deep features of the blurred input images 402 from their associated feature maps. For example, the deep feature extractor 408 may include multiple residual groups (RGs) 410a-410n, which represent building blocks or modules for the deep feature extractor 408 and are described below. In general, the residual groups 410a-410n are used to form a residual in residual (RIR) structure, which is used to implement a deep machine learning network. Outputs of the final residual group 410n are processed using a convolution layer 412, and outputs from the convolution layer 412 can be combined with the inputs to the deep feature extractor 408 by a combiner 414. The inputs to the deep feature extractor 408 are provided to the combiner 414 via a long skip connection 416, which allows low-frequency information to bypass the residual groups 410a-410n and the convolution layer 412 and allows for residual learning at a coarse level. The information output from the deep feature extractor 408 includes one or more sharpened output images 418, which represent improved versions of the one or more blurred input images 402 (namely with at least some of the blur removed from the input image(s) 402). Note that the deep feature extractor 408 may include any suitable number of residual groups 410a-410n, such as ten residual groups 410a-410n. Weights or other parameters of the components of the deep feature extractor 408 can be adjusted during the training of the architecture 400, such as in the manner described above, so that the deep feature extractor 408 learns which deep features of the blurred input images 402 are useful in removing blur.

In the example shown in FIG. 4, each of the residual groups 410a-410n may include multiple residual channel attention blocks (RCABs) 420a-420m, which generally operate to provide channel attention and extract channel statistics among channels. For example, the residual channel attention blocks 420a-420m can be used to learn various residuals associated with the input data provided to the residual channel attention blocks 420a-420m. Outputs of the final residual channel attention block 420m are processed using a convolution layer 422, and outputs from the convolution layer 422 can be combined with the inputs to the residual group 410a-410n by a combiner 424. The inputs to the residual group 410a-410n are provided to the combiner 424 via a short skip connection 426. The short skip connection 426 again allows low-frequency information to bypass the residual channel attention blocks 420a-420m and the convolution layer 422. Note that each residual group 410a-410n may include any suitable number of residual channel attention blocks 420a-420m, such as eight residual channel attention blocks 420a-420m.

In the example shown in FIG. 4, each of the residual channel attention blocks 420a-420m may include two convolution layers 428a-428b and a rectified linear unit (ReLU) 430, which are followed by a channel attention layer 432. The convolution layers 428a-428b apply convolution functions to the data being processed, and the rectified linear unit 430 functions as an activation layer. The channel attention layer 432 can be used to give higher importance to one or more channels of data compared to one or more other channels of data. Outputs from the channel attention layer 432 can be combined with the inputs to the residual channel attention block 420a-420m by a combiner 434. The inputs to the residual channel attention block 420a-420m are provided to the combiner 434 via a short skip connection 436.

Overall, the deep feature extractor 408 here includes a combination of residual convolutional layers and channel attention layers, which can be used to learn improved feature maps for the blurred input images 402. These improved feature maps can include the deep features of the blurred input images 402 that are identified by the deep feature extractor 408. This architecture 400 may be referred to as a residual image enhancement network (RIEN) since it uses residuals to enhance the input images 402 being processed. Note that while residual channel attention networks have been developed and used for super-resolution applications, these residual channel attention networks have not been applied to remove in-processing blur from images.

Some prior approaches implement multi-stage processing architectures, such as the MPRNet approach that performs multi-stage progressive image restoration. In particular, the MPRNet approach includes encoder-decoder stages with supervised attention and an additional original-resolution subnetwork (ORSNet) stage. According to the MPRNet design, the encoder-decoder stages are supposed to help learn contextualized features (high-level details), and the ORSNet stage is supposed to learn local-level details of images. However, the complexity of the overall MPRNet architecture increases significantly due to the use of the encoder-decoder stages. As it turns out, for sharpening images experiencing in-processing blur, the encoder-decoder stages do not help significantly in terms of sharpening results and visual quality. Thus, the architecture 400 omits any encoder-decoder stages, resulting in a single-stage architecture. Also, the ORSNet can be replaced by the RIEN described above, resulting in a low-complexity AI sharpening network that is highly effective in removing blur from images. In some cases, the complexity reduction can be significant. For instance, the overall MPRNet architecture could have around 20 million parameters, while the described approach could have around 7.8 million parameters (although these values are for illustration only). Even though the described approach has less complexity and fewer parameters, the described approach can still provide effective sharpening results, such as in terms of peak signal-to-noise ratio (PSNR) and structural similarity (SSIM) (which are well-known quantitative metrics used in image quality assessments) while using significantly less memory.

Although FIG. 4 illustrates one example of a machine learning model architecture 400 for image sharpening, various changes may be made to FIG. 4. For example, the order of the operations performed within the architecture 400 may vary from what is shown in FIG. 4. Also, one or more additional operations may be included or one or more of the operations shown in FIG. 4 may be omitted if needed or desired. Further, various components in FIG. 4 may be combined, further subdivided, replicated, or rearranged according to particular needs.

Figure 5A:
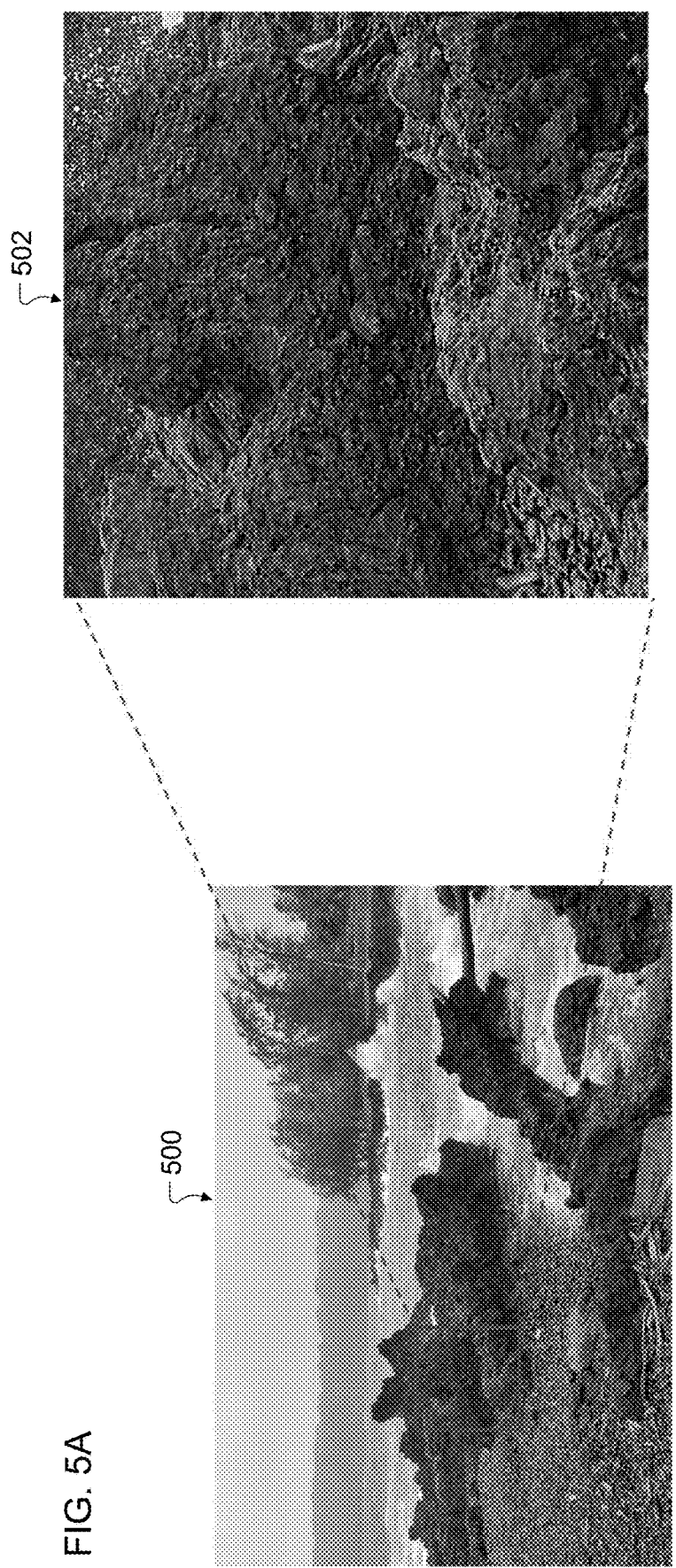
FIGS. 5A and 5B illustrate example results obtained using a trained machine learning model for image sharpening in accordance with this disclosure.
Figure 5B:
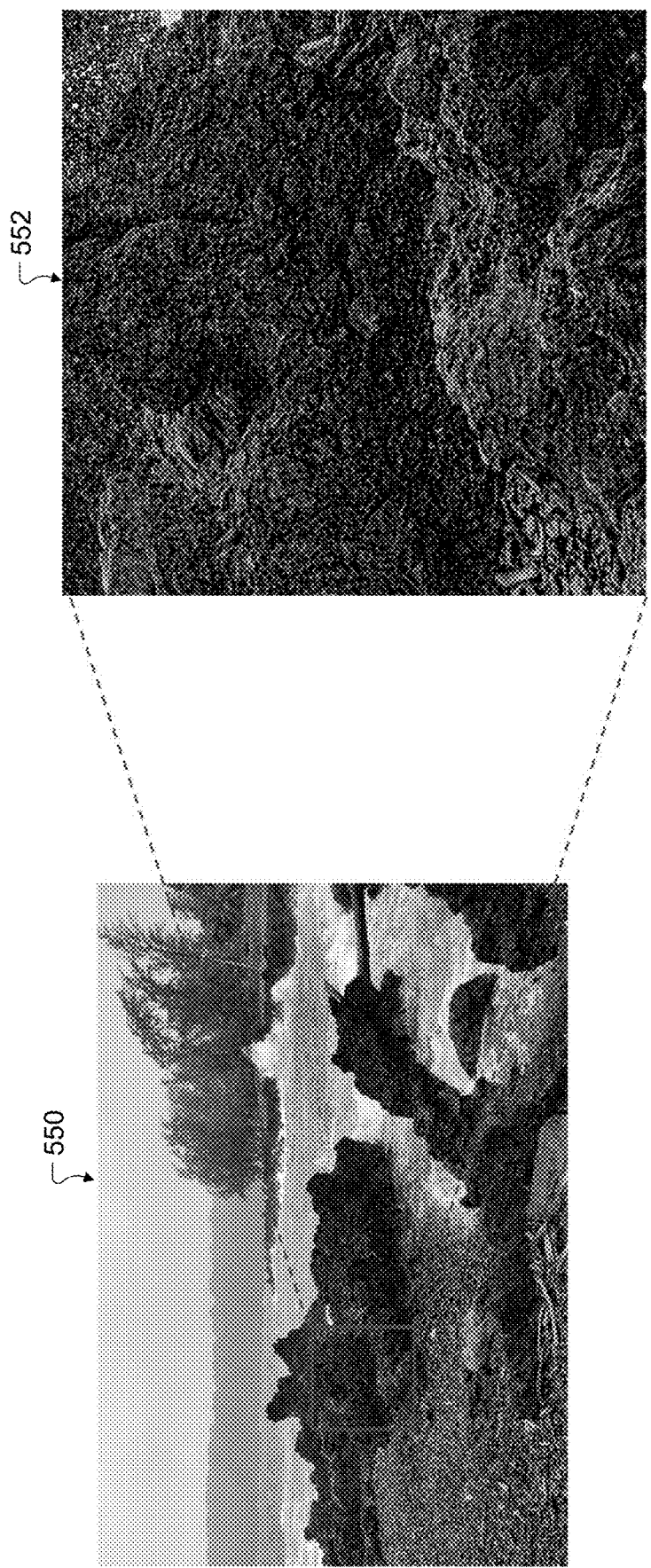

FIGS. 5A and 5B illustrate example results obtained using a trained machine learning model for image sharpening in accordance with this disclosure. In FIG. 5A, an image 500 of a natural scene is shown, and a portion 502 of the image 500 is shown in enlarged form. The image 500 may, for example, represent a blurred input image 402, such as an image generated using the demosaicing and noise reduction operations 206 and 208 of the image processing pipeline 200. The image 500 here contains a relatively large amount of in-processing blur, which causes finer details in the image 500 to become lost.

In FIG. 5B, an image 550 of the same natural scene is shown, and a portion 552 of the image 550 is shown in enlarged form. The image 550 may, for example, represent a sharpened output image 418 generated by the AI-based sharpening operation 210 of the image processing pipeline 200, such as by using the machine learning model architecture 400 to process the image 500. As can be seen here, the image 550 is sharper, and at least a significant portion of the blur contained in the original image 500 has been removed in the image 550. As a result, the image 550 shows finer details of the scene that might otherwise be lost due to the presence of the in-processing blur.

Although FIGS. 5A and 5B illustrate one example of results obtained using a trained machine learning model for image sharpening, various changes may be made to FIGS. 5A and 5B. For example, images of scenes can vary widely, and the blur contained in the images can also vary based on the circumstances and the image processing pipeline implementation. As a result, FIGS. 5A and 5B are merely meant to illustrate one example of the type of results that could be obtained using the approaches described in this disclosure. However, FIGS. 5A and 5B do not limit the scope of this disclosure to any particular type of results.

Figure 6:
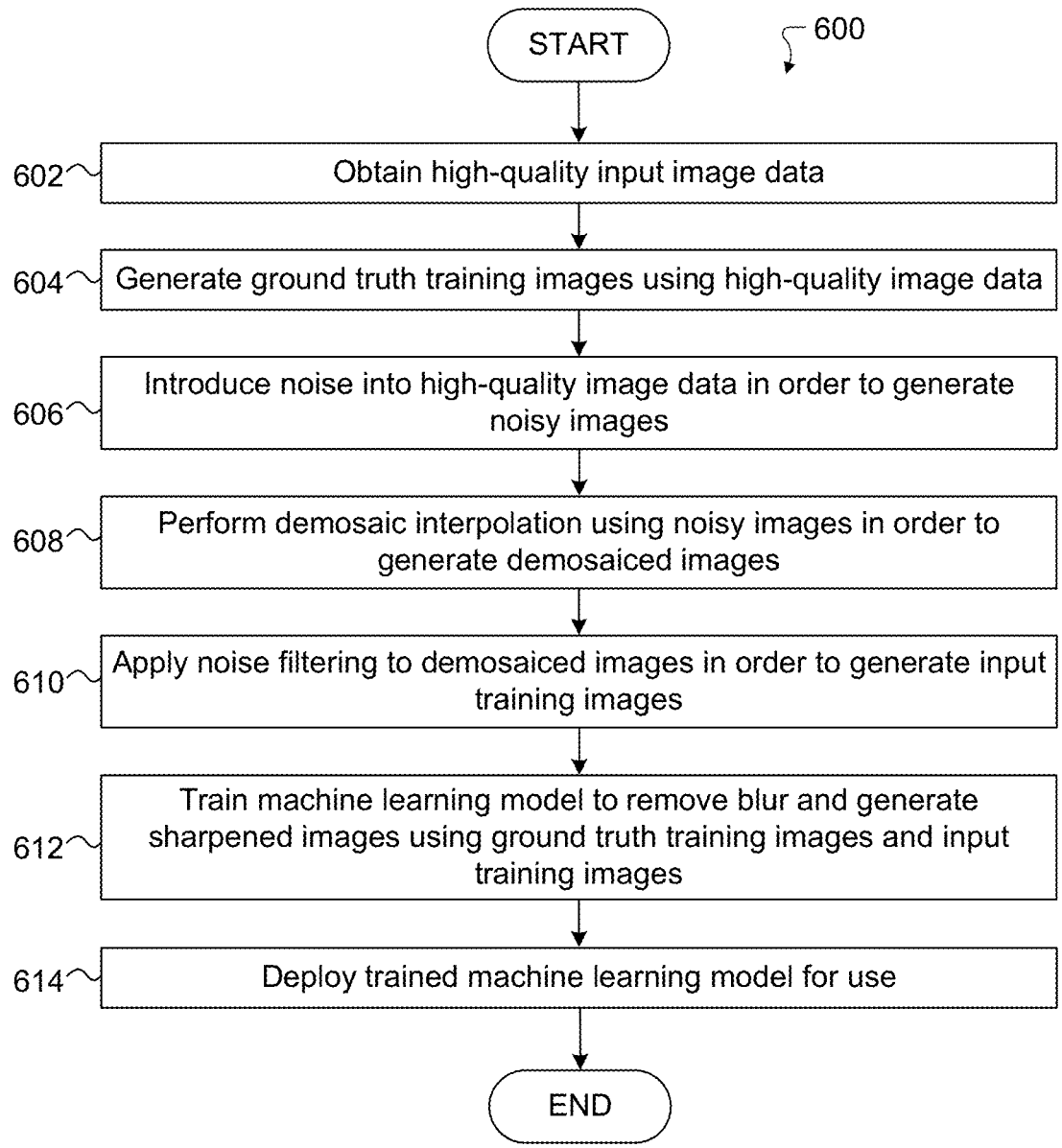
FIG. 6 illustrates an example method for synthetic training data generation in accordance with this disclosure.

FIG. 6 illustrates an example method 600 for synthetic training data generation in accordance with this disclosure. For ease of explanation, the method 600 shown in FIG. 6 is described as being performed using the server 106 in the network configuration 100 of FIG. 1, such as when the server 106 implements the pipeline 300 of FIG. 3. However, the method 600 shown in FIG. 6 could be performed using any other suitable device (such as the electronic device 101) and any other suitable pipeline and in any other suitable system.

As shown in FIG. 6, high-quality input image data is obtained at step 602. This may include, for example, the processor 120 of the server 106 obtaining high-quality input image data 304 from one or more sources 302. The high-quality input image data 304 can define multiple images that are very sharp and contain little noise. Ground truth training images are generated using the high-quality input image data at step 604. This may include, for example, the processor 120 of the server 106 performing the first demosaic operation 306 to convert the high-quality input image data 304 into ground truth training images 308. In some embodiments, the first demosaic operation 306 performs minimum filtering when performing demosaic interpolation operations in order to generate the ground truth training images 308 with minimal noise.

Noise is introduced into the high-quality input image data at step 606. This may include, for example, the processor 120 of the server 106 using the noise model 310 to introduce synthetic or artificially-created noise (such as read noise and shot noise) into the high-quality image data 304 and produce noisy images 316. Demosaic interpolation operations are performed using the noisy images in order to generate demosaiced images at step 608. This may include, for example, the processor 120 of the server 106 performing the second demosaic operation 312 to convert the noisy images 316 into demosaiced images 318. In some embodiments, the second demosaic operation 312 can perform or otherwise simulate the type of operations performed by the demosaicing operation 206 of the image processing pipeline 200. Also, in some embodiments, the second demosaic operation 312 can generate the demosaiced images 318 in the YUV image domain. Noise filtering is applied to the demosaiced images in order to generate input training images at step 610. This may include, for example, the processor 120 of the server 106 performing the noise filtering operation 314 to remove noise from the demosaiced images 318 and produce the input training images 320. In some embodiments, the noise filtering operation 314 can perform or otherwise simulate the type of operations performed by the noise reduction operation 208 of the image processing pipeline 200. Also, in some embodiments, the noise filtering operation 314 can generate the input training images 320 in the RGB image domain.

A machine learning model is trained using the ground truth training images and the input training images at step 612. This may include, for example, the processor 120 of the server 106 performing an iterative training process in which the input training images 320 are provided to a machine learning model, the machine learning model generates output images, losses are determined based on differences between the output images and the ground truth training images 308, and weights or other parameters of the machine learning model are adjusted in order to reduce the losses. In some embodiments, the loss function used here may calculate an L1 Charbonnier with edge loss. Also, in some embodiments, the machine learning model may be trained using an Adam optimizer. At some point, the training concludes, such as when the calculated losses are below a threshold value. The trained machine learning model is deployed for use at step 614. This may include, for example, the processor 120 of the server 106 providing the trained machine learning model 324 to one or more electronic devices (such as the electronic device 101) for use in an image processing pipeline 200.

Although FIG. 6 illustrates one example of a method 600 for synthetic training data generation, various changes may be made to FIG. 6. For example, while shown as a series of steps, various steps in FIG. 6 may overlap, occur in parallel, occur in a different order, or occur any number of times.

Figure 7:
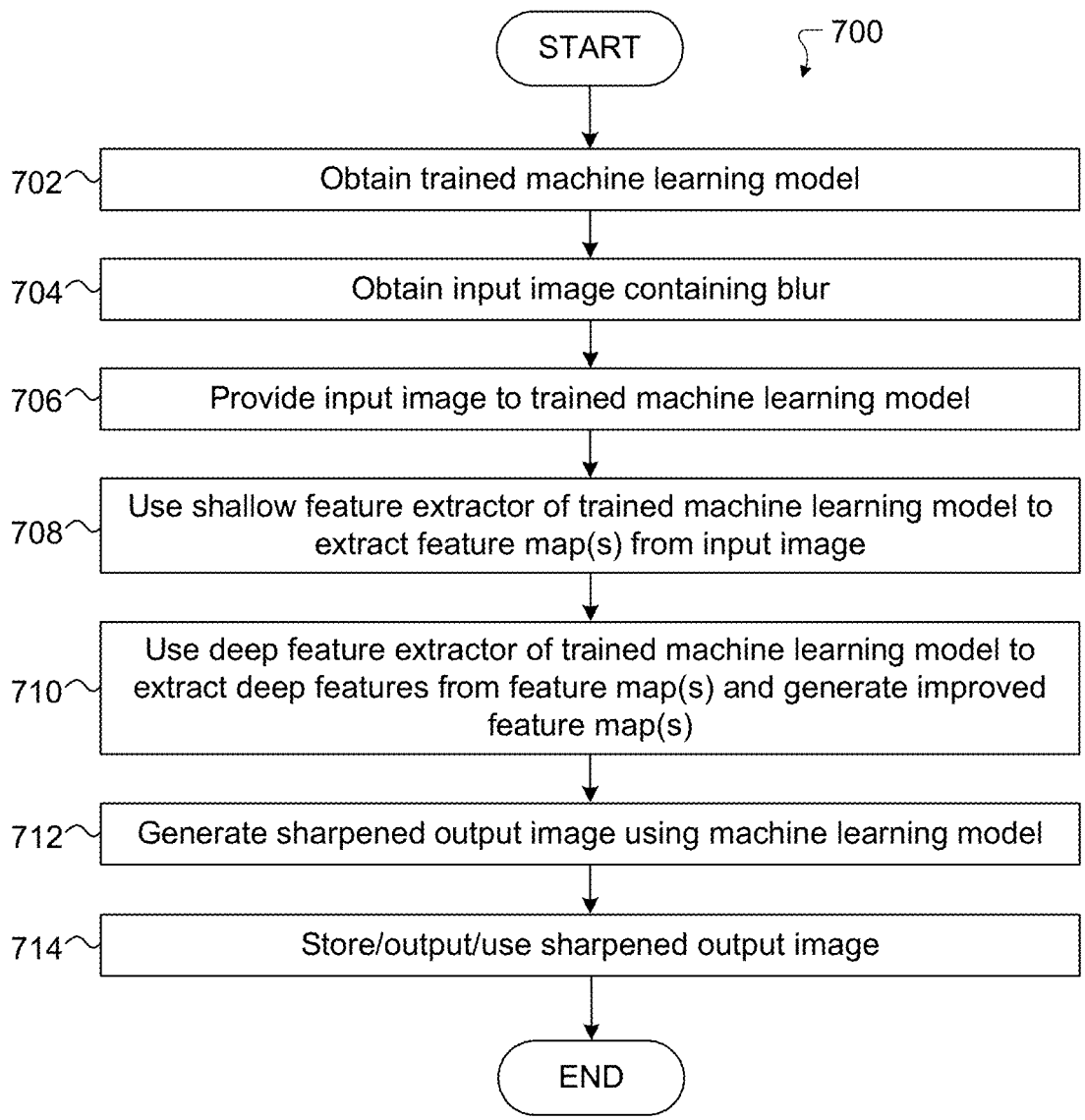
FIG. 7 illustrates an example method for image sharpening using a trained machine learning model in accordance with this disclosure.

FIG. 7 illustrates an example method 700 for image sharpening using a trained machine learning model in accordance with this disclosure. For ease of explanation, the method 700 shown in FIG. 7 is described as being performed using the electronic device 101 in the network configuration 100 of FIG. 1, such as when the electronic device 101 implements the machine learning model architecture 400 of FIG. 4. However, the method 700 shown in FIG. 7 could be performed using any other suitable device (such as the server 106) and any other suitable machine learning model architecture and in any other suitable system.

As shown in FIG. 7, a trained machine learning model is obtained at step 702. This may include, for example, the processor 120 of the electronic device 101 obtaining a trained machine learning model 324 from the server 106. In some embodiments, the trained machine learning model 324 may be trained using the method 600 of FIG. 6 described above. An input image containing blur is obtained at step 704. This may include, for example, the processor 120 of the electronic device 101 receiving a blurred input image 402, such as during an image capture by one or more imaging sensors 180 of the electronic device 101. The input image is provided to the trained machine learning model at step 706. This may include, for example, the processor 120 of the electronic device 101 providing the image data of the blurred input image 402 as input to the trained machine learning model 324.

A shallow feature extractor of the trained machine learning model is used to extract one or more feature maps associated with the input image at step 708. This may include, for example, the processor 120 of the electronic device 101 using the convolution layer 406 of the shallow feature extractor 404 to generate one or more feature maps using the image data of the blurred input image 402. A deep feature extractor of the trained machine learning model is used to extract deep features of the input image using the one or more feature maps associated with the input image at step 710. This may include, for example, the processor 120 of the electronic device 101 using the residual convolutional layers and channel attention layers in the residual groups 410a-410n of the deep feature extractor 408 to generate one or more improved feature maps for the blurred input image 402. A sharpened output image is generated using the trained machine learning model at step 712. This may include, for example, the processor 120 of the electronic device 101 generating a sharpened output image 418 using the deep features of the blurred input image 402.

The sharpened output image can be stored, output, or used in some manner at step 714. This could include, for example, the processor 120 of the electronic device 101 displaying the sharpened output image on the display 160 of the electronic device 101. This could also include the processor 120 of the electronic device 101 saving the sharpened output image to a camera roll stored in a memory 130 of the electronic device 101. This could further include the processor 120 of the electronic device 101 attaching the sharpened output image to a text message, email, or other communication to be transmitted from the electronic device 101. Of course, the sharpened output image could be used in any other or additional manner.

Although FIG. 7 illustrates one example of a method 700 for image sharpening using a trained machine learning model, various changes may be made to FIG. 7. For example, while shown as a series of steps, various steps in FIG. 7 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining an input image that contains blur;
   providing the input image to a trained machine learning model, the trained machine learning model comprising (i) a shallow feature extractor configured to extract one or more feature maps from the input image and (ii) a deep feature extractor configured to extract deep features from the one or more feature maps; and
   using the trained machine learning model to generate a sharpened output image;
   wherein the trained machine learning model is trained using ground truth training images and input training images, the input training images comprising versions of the ground truth training images with blur created using demosaic and noise filtering operations.

2. The method of claim 1, further comprising:
   training a machine learning model using the ground truth training images and the input training images in order to generate the trained machine learning model.

3. The method of claim 2, further comprising:
   generating the input training images by:
      introducing noise into image data used to form the ground truth training images using a synthetic noise model in order to generate noisy images;
      performing a demosaic interpolation using the noisy images in order to generate demosaiced images; and
      applying a noise filter to the demosaiced images in order to generate the input training images.

4. The method of claim 1, wherein:
   the shallow feature extractor comprises a convolution layer configured to extract the one or more feature maps; and
   the deep feature extractor comprises multiple residual convolutional layers and multiple channel attention layers configured to generate one or more improved feature maps, the one or more improved feature maps containing the deep features.

5. The method of claim 1, wherein:
   the deep feature extractor comprises multiple residual groups; and
   each residual group comprises multiple residual channel attention blocks (RCABs).

6. The method of claim 1, wherein the trained machine learning model represents a single-stage machine learning model.

7. The method of claim 1, wherein the trained machine learning model comprises a raw image enhancement network.

8. An apparatus comprising:
   at least one processing device configured to:
      obtain an input image that contains blur;
      process the input image using a trained machine learning model, the trained machine learning model comprising (i) a shallow feature extractor configured to extract one or more feature maps from the input image and (ii) a deep feature extractor configured to extract deep features from the one or more feature maps; and
      use the trained machine learning model to generate a sharpened output image;
   wherein the trained machine learning model is trained using ground truth training images and input training images, the input training images comprising versions of the ground truth training images with blur created using demosaic and noise filtering operations.

9. The apparatus of claim 8, wherein the at least one processing device is further configured to train a machine learning model using the ground truth training images and the input training images in order to generate the trained machine learning model.

10. The apparatus of claim 9, wherein:
    the at least one processing device is further configured to generate the input training images; and
    to generate the input training images, the at least one processing device is configured to:
       introduce noise into image data used to form the ground truth training images using a synthetic noise model in order to generate noisy images;
       perform a demosaic interpolation using the noisy images in order to generate demosaiced images; and
       apply a noise filter to the demosaiced images in order to generate the input training images.

11. The apparatus of claim 8, wherein:
    the shallow feature extractor comprises a convolution layer configured to extract the one or more feature maps; and
    the deep feature extractor comprises multiple residual convolutional layers and multiple channel attention layers configured to generate one or more improved feature maps, the one or more improved feature maps containing the deep features.

12. The apparatus of claim 8, wherein:
    the deep feature extractor comprises multiple residual groups; and
    each residual group comprises multiple residual channel attention blocks (RCABs).

13. The apparatus of claim 8, wherein the trained machine learning model represents a single-stage machine learning model.

14. The apparatus of claim 8, wherein the trained machine learning model comprises a raw image enhancement network.

15. A non-transitory computer readable medium containing instructions that when executed cause at least one processor to:
obtain an input image that contains blur;
process the input image using a trained machine learning model, the trained machine learning model comprising (i) a shallow feature extractor configured to extract one or more feature maps from the input image and (ii) a deep feature extractor configured to extract deep features from the one or more feature maps; and
use the trained machine learning model to generate a sharpened output image;
wherein the trained machine learning model is trained using ground truth training images and input training images, the input training images comprising versions of the ground truth training images with blur created using demosaic and noise filtering operations.

16. The non-transitory computer readable medium of claim 15, wherein the instructions when executed further cause the at least one processor to train a machine learning model using the ground truth training images and the input training images in order to generate the trained machine learning model.

17. The non-transitory computer readable medium of claim 16, wherein:
the instructions when executed further cause the at least one processor to generate the input training images; and
the instructions that when executed cause the at least one processor to generate the input training images comprise instructions that when executed cause the at least one processor to:
introduce noise into image data used to form the ground truth training images using a synthetic noise model in order to generate noisy images;
perform a demosaic interpolation using the noisy images in order to generate demosaiced images; and
apply a noise filter to the demosaiced images in order to generate the input training images.

18. The non-transitory computer readable medium of claim 15, wherein:
the shallow feature extractor comprises a convolution layer configured to extract the one or more feature maps; and
the deep feature extractor comprises multiple residual convolutional layers and multiple channel attention layers configured to generate one or more improved feature maps, the one or more improved feature maps containing the deep features.

19. The non-transitory computer readable medium of claim 15, wherein:
the deep feature extractor comprises multiple residual groups; and
each residual group comprises multiple residual channel attention blocks (RCABs).

20. The non-transitory computer readable medium of claim 15, wherein the trained machine learning model represents a single-stage machine learning model.

21. A method comprising:
obtaining multiple ground truth training images;
generating multiple input training images using the ground truth training images, wherein generating the input training images comprises performing demosaic and noise filtering operations to add blur to the ground truth training images; and
training a machine learning model to remove blur from images and generate sharpened images using the ground truth training images and the input training images.

22. The method of claim 21, wherein:
each ground truth training image has a first ISO value; and
each input training image is generated using an associated one of the ground truth training images and has a second ISO value larger than the first ISO value of the associated ground truth training image.

23. The method of claim 21, wherein performing the demosaic and noise filtering operations comprises:
introducing noise into image data used to form the ground truth training images using a synthetic noise model in order to generate noisy images;
performing a demosaic interpolation using the noisy images in order to generate demosaiced images; and
applying a noise filter to the demosaiced images in order to generate the input training images.

24. The method of claim 23, wherein the synthetic noise model models read and shot noise.

25. The method of claim 23, wherein:
the demosaic interpolation converts raw image data into YUV image data; and
the noise filter is applied to the YUV image data in order to generate raw RGB image data.

26. The method of claim 21, wherein training the machine learning model comprises training the machine learning model based on an L1 Charbonnier with edge loss using an Adam optimizer.

* * * * *